(12) United States Patent
Fujimoto

(10) Patent No.: US 11,268,850 B2
(45) Date of Patent: Mar. 8, 2022

(54) ANALOG FRONT END FOR SIGNAL READING BY HAVING A VARIABLE BIAS VOLTAGE GENERATION CIRCUIT CORRECT CHARACTERISTICS OF A SENSOR

(71) Applicant: SHARP KABUSHIKI KAISHA, Sakai (JP)

(72) Inventor: Yoshihisa Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 127 days.

(21) Appl. No.: 16/582,246

(22) Filed: Sep. 25, 2019

(65) Prior Publication Data
US 2020/0103275 A1   Apr. 2, 2020

Related U.S. Application Data

(60) Provisional application No. 62/739,148, filed on Sep. 28, 2018.

(51) Int. Cl.
*G01J 1/44* (2006.01)
*H04N 5/378* (2011.01)
*H04N 5/369* (2011.01)

(52) U.S. Cl.
CPC ............. *G01J 1/44* (2013.01); *H04N 5/3698* (2013.01); *H04N 5/378* (2013.01); *G01J 2001/444* (2013.01); *G01J 2001/446* (2013.01)

(58) Field of Classification Search
CPC .. G01J 1/44; G01J 2001/444; G01J 2001/446; H04N 5/378; H04N 5/3698; H04N 5/359; H01L 27/14609
See application file for complete search history.

(56) References Cited

U.S. PATENT DOCUMENTS

| | | | |
|---|---|---|---|
| 7,924,332 B2 | 4/2011 | Gruev et al. | |
| 2004/0069929 A1* | 4/2004 | Furukawa | H04N 5/35518 250/208.1 |
| 2006/0017714 A1* | 1/2006 | Yonemoto | H04N 5/3658 345/204 |
| 2013/0207214 A1* | 8/2013 | Haddad | H01L 31/0236 257/432 |
| 2017/0211984 A1* | 7/2017 | Simolon | G01J 5/24 |

OTHER PUBLICATIONS

N. Safavian, G. R. Chaji, K.S. Karim, and J. A. Rowland: "A Novel Hybrid Active-Passive Pixel with Correlated Double Sampling CMOS Readout Circuit for Medical X-ray Imaging".
Mao-Hsun Cheng, Chumin Zhao, Jerzy Kanicki: "Study of Current-Mode Active Pixel Sensor Circuits Using Amorphous InSnZnO Thin-Film Transistor for 50μm Pixel-Pitch Indirect X-Ray Imagers".
Abbas El Gamal, Helmy Eltoukhy: "CMOS image sensors", IEEE Circuits & Devices Magazine, May/Jun. 2005, pp. 6-20,2005.

* cited by examiner

*Primary Examiner* — Jennifer D Bennett
(74) *Attorney, Agent, or Firm* — ScienBiziP, P.C.

(57) ABSTRACT

An analog front end that reads from a sensor an output signal which is either a current output signal (IOUT) or a charge output signal corrects characteristics of the sensor by adjusting a bias voltage ($VBIAS_{IN}$) of an output signal line from the sensor.

8 Claims, 8 Drawing Sheets

Conventional ART

ANALOG FRONT END FOR SIGNAL READING BY HAVING A VARIABLE BIAS VOLTAGE GENERATION CIRCUIT CORRECT CHARACTERISTICS OF A SENSOR

TECHNICAL FIELD

The present invention relates to an analog front end that reads an output signal of a current or charge output sensor.

BACKGROUND ART

An image sensor of an active pixel sensor (APS) type configured with several transistors and one photodiode per pixel is known. PTL 1 and NPL 2 disclose configuration examples of an analog front end (AFE) for reading output signals from a sensor such as a current output sensor and a current output sensor.

A configuration of the image sensor disclosed in NPL 2 is illustrated in FIG. 1 (see FIG. 2(a) of NPL 2). In an image sensor 10 of the related art, a plurality of sensors 91 are connected to one analog front end 100 through one column line 92.

Each sensor 91 is configured with a photodiode PD, a switch SW1, a transistor GM, and a switch SW2. The switch SW1 is a switch for resetting a cathode of the photodiode PD with a bias voltage $V_{PDH}$. The transistor GM is a transistor for outputting a current having a value depending on that of a cathode voltage VPD of the photodiode PD. A bias voltage $V_{PDL}$ is applied to an anode terminal of the photodiode PD. The switch SW2 is a switch for selectively outputting an output current from the sensor 91 to the analog front end 100.

The analog front end 100 is configured with an integration circuit 110 and a delta-reset sampling (DRS) circuit 120 (DRS). The integration circuit 110 is a circuit for integrating an output current from the sensor 91, and is configured with a capacitor CINT, a switch SW3, and an operational amplifier OPAMP1. The switch SW3 is a switch for resetting the capacitor CINT. The delta-reset sampling circuit 120 (DRS) is a circuit for calculating a difference between outputs of the integration circuit at two different points in time. As illustrated in NPL 1, a delta reset sampling technology is a circuit technology often used to reduce noise of an image sensor, along with a correlated double sampling (CDS) technology (see FIG. 14 of NPL 1).

CITATION LIST

Patent Literature

[PTL 1] U.S. Pat. No. 7,924,332 Specification

Non Patent Literature

[NPL 1] Abbas El Gamal and Helmy Eltoukhy, "CMOS image sensors", IEEE CIRCUITS & DEVICES MAGAZINE, MAY/JUNE 2005, pp. 6-20, 2005
[NPL 2] Mao-Hsun Cheng et al., "Study of Current-Mode Active Pixel Sensor Circuits Using Amorphous InSnZnO Thin-Film Transistor for 50 µm Pixel-Pitch Indirect X-Ray Imagers", Solid-State Electronics, vol. 131, pp. 53-64, May 2017
[NPL 3] N. Safavian et al., "A Novel Hybrid Active-Passive Pixel with Correlated Double Sampling CMOS Readout Circuit for Medical X-ray Imaging", IEEE International Symposium on Circuits and Systems, pp. 3170-3173, May 2008

SUMMARY OF INVENTION

Technical Problem

A timing chart for an operation of an image sensor of the related art of FIG. 1 is illustrated in FIG. 2. At time t0a, a control signal $RST_{PD}$ of the switch SW1 becomes high, and the switch SW1 is turned on. Then, the cathode is biased to the bias voltage $V_{PDH}$, and the photodiode PD is reset (reset period). Next, at time t0b, a control signal $RST_{PD}$ of the switch SW1 becomes low, and the switch SW1 is turned off. Then, the cathode of the photodiode PD enters a floating state, and the light charges generated by light reception can be accumulated in the cathode. Consequently, the cathode voltage VPD drops according to the amount of light charges accumulated.

At time t1, a control signal $RST_{INT}$ of the switch SW3 temporarily becomes high, and the switch SW3 is turned on. Then, the charges of the capacitor CINT of the analog front end 100 are reset to zero.

In order to read a light charge signal of the photodiode PD in which the light charges are accumulated in a period from time t0b to time t2, a control signal $RD_{PD}$ of the switch SW2 temporarily becomes high at time t2 (light charge signal read period). Then, the switch SW2 is turned on, a current depending on the cathode voltage VPD is output to the integration circuit 110 of the analog front end 100 through the transistor GM, and an output VOUT of the integration circuit 110 becomes the voltage V0. The voltage V0 is a voltage corresponding to the light charge signal of the photodiode PD according to the accumulated light charges.

Thereafter, in order to detect the amount of light during a next accumulation period, the cathode is once biased to the bias voltage $V_{PDH}$, and the photodiode PD is reset. At time t3 immediately after the reset, the control signal $RD_{PD}$ of the switch SW2 becomes high, and the switch SW2 is turned on. Then, an output current corresponding to a value of the cathode voltage VPD immediately after the reset is integrated by the integration circuit. As a result, an output VOUT of the integration circuit 110 becomes V1. The voltage V1 is a voltage corresponding to a state of the photodiode PD immediately after the reset.

The delta-reset sampling circuit 120 (DRS) outputs a difference V1−V0 between voltage outputs of the integration circuit at two different points in time described above. The difference V1−V0 between the voltage outputs is a voltage signal from which low frequency noise and DC offset components from the transistor GM and the like are removed and which corresponds to the light charges accumulated in the cathode of the photodiode PD from time t0b to time t2. In this manner, the difference V1−V0 between the voltage outputs of the integration circuit is output as an output VOUT_DRS of the analog front end 100.

In a case where an image sensor which uses a thin-film transistor (TFT) liquid crystal panel is applied to X-ray detection, a size of the panel is large, a column line is long, and therefore, a large parasitic capacitance is added to the column line. In such a case, as described in NPL 2, a current output type may be used rather than a voltage output type that is typically used in a complementary metal oxide semiconductor (CMOS) image sensor. The voltage output type uses a voltage signal for which a voltage of the column line changes. Meanwhile, in the current output type, the voltage of the column line is kept steady. However, in the current output type image sensor, a characteristic variation (transconductance, threshold voltage variation) of the transistor GM which converts the cathode voltage VPD of the photodiode PD into a current is large, and thus, complicated means for correcting the variation is demanded.

NPL 3 discloses means for correcting the characteristic variation of a transistor GM in a current output type image sensor. A configuration of an image sensor 30 disclosed in NPL 3 is illustrated in FIG. 3 (see FIG. 1(a) of NPL 3). The image sensor 30 further includes a DC current source $IBIAS_{GM}$, a switch SW4, and a switch SW5 in addition to a configuration of the image sensor 10 of FIG. 1.

In the image sensor 30, during a reset period in which a switch SW1 is turned on ($RST_{PD}$=high) in order to reset the photodiode PD, a switch SW2 and the switch SW4 are turned on, and the switch SW5 is turned off ($RD_{PD}$=low). At this time, a bias current from the DC current source $IBIAS_{GM}$ flows between a drain and a source of the transistor GM through the switch SW4 and the switch SW2, and the cathode voltage VPD of the photodiode PD which is also a gate voltage of the transistor GM is adjusted. By this operation, a transconductance variation of the transistor GM and a threshold voltage variation are reduced. Control signals of the switch SW4 and the switch SW2 are generated by the control signal $RST_{PD}$ of the switch SW1 and a control signal $RD_{PD}$ of the switch SW5 being input to the OR circuit.

Meanwhile, during a read period (light charge signal read period) of a signal corresponding to the light charges accumulated in the photodiode PD, the switch SW1 is turned off, and the switch SW2, the switch SW4, and the switch SW5 are turned on ($RP_{PD}$=high, $RST_{PD}$=low). As a result, a bias voltage of the column line becomes a bias voltage $VBIAS_{AMP}$ which is input to the integration circuit connected through the switch SW5.

However, since the column line to which a large parasitic capacitance is added is connected to the cathode terminal of the photodiode PD through the switch SW1 during a period in which the photodiode PD is reset, it takes time to reset the photodiode PD. That is, it takes time for the cathode voltage VPD to be stabilized. Further, the voltage of the column line is changed between the reset period and the light charge signal read period. Therefore, a transition between a reset operation of the photodiode PD and a read operation of the light charge signal takes time. Furthermore, as described above, the cathode voltage VPD at the time of resetting the photodiode PD is changed for each sensor depending on a transconductance variation of the transistor GM and a threshold voltage variation. Therefore, a reverse bias voltage ($VPD-V_{PDL1}$) applied to the photodiode PD at the time of the reset is also changed for each sensor. From this, a characteristic variation of a photodiode for each sensor occurs.

One aspect of the present invention aims to provide an analog front end that is capable of correcting a characteristic difference between sensors without reduction of an operation speed.

Solution to Problem (1) According to one embodiment of the present invention, an analog front end that reads from a sensor an output signal which is either a current output signal or a charge output signal corrects characteristics of the sensor by adjusting a bias voltage of an output signal line from the sensor.

(2) According to one embodiment of the present invention, an analog front end, which reads from a sensor an output signal that is either a current output signal or a charge output signal, includes a transimpedance amplifier that converts the output signal into a voltage signal, and a variable bias voltage generation circuit. The output signal changes depending on a bias voltage of an output signal line from the sensor. The variable bias voltage generation circuit corrects characteristics of the sensor by adjusting the bias voltage of the output signal line.

(3) According to a certain embodiment of the present invention, in addition to the configuration of (2) described above, the analog front end further includes a current source. The output signal line is connected to the current source during a reset period of the sensor, or immediately after the reset period ends. At a time of the connection, the adjustment of the bias voltage is performed such that a current flowing through the output signal line has a predetermined value.

(4) According to a certain embodiment of the present invention, in addition to the configuration of (3) described above, the analog front end further includes a current integration circuit for detecting a current flowing through the output signal line.

(5) According to a certain embodiment of the present invention, in addition to any one configuration of (2) to (4) described above, the variable bias voltage generation circuit includes a DA conversion circuit that generates a voltage signal.

(6) According to a certain embodiment of the present invention, in addition to any one configuration of (1) to (5) described above, the sensor is a light receiving pixel that includes a photodiode, a switch for resetting the photodiode, and a transistor having a gate terminal connected to the photodiode and a source terminal or an emitter terminal connected to the output signal line.

Advantageous Effects of Invention

According to one aspect of the present invention, it is possible to realize an analog front end that is capable of correcting a read transistor variation without reduction of an operation speed.

DESCRIPTION OF EMBODIMENTS

Embodiment 1

Hereinafter, one embodiment of the present invention will be described in detail.

(Configuration of Image Sensor Provided with Analog Front End)

Figure 4:
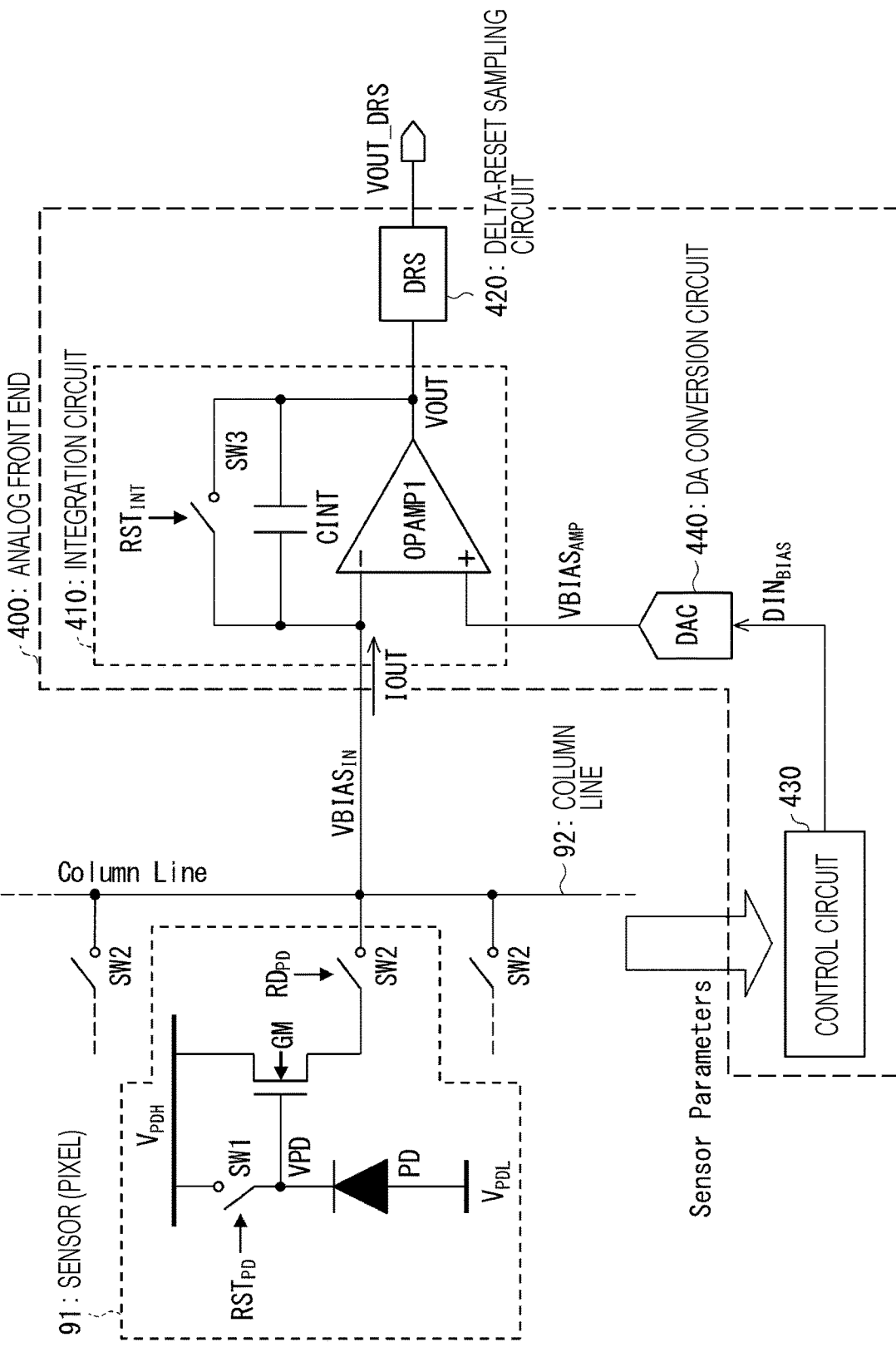
FIG. 4 is a circuit diagram of an image sensor to which an analog front end according to Embodiment 1 is applied.

FIG. 4 is a diagram illustrating a circuit configuration example of an image sensor 40 to which an analog front end 400 according to Embodiment 1 is applied. FIG. 4 simultaneously illustrates a sensor 91 and a column line 92 in addition to the analog front end 400.

The sensor 91 is configured with a photodiode PD, a switch SW1, a switch SW2, and a transistor GM. A bias voltage $V_{PDL}$ is applied to an anode terminal of the photodiode PD. A bias voltage $V_{PDH}$ is applied to a cathode terminal of the photodiode PD through the switch SW1. The switch SW1 resets the cathode of the photodiode PD to the bias voltage $V_{PDH}$ in response to a control signal $RST_{PD}$ of the switch SW1. The cathode terminal of the photodiode PD is also connected to a gate terminal of the transistor GM. Thus, a cathode voltage VPD of the photodiode PD is equal to a gate voltage of the transistor GM.

The bias voltage $V_{PDH}$ is applied to a drain terminal (or a collector terminal) of the transistor GM. A source terminal (or an emitter terminal) of the transistor GM is connected to the column line 92 through the switch SW2. The switch SW2 performs an on/off operation in response to a control signal $RD_{PD}$ of the switch SW2.

A plurality of the sensors 91 are connected to one analog front end 400 through one column line 92. The respective sensors are sequentially selected in a row by the control signal $RD_{PD}$ of each switch SW2 of each sensor 91, and therefore, signals from each sensor 91 are sequentially processed.

(Configuration of Analog Front End)

The analog front end 400 according to Embodiment 1 is configured with an integration circuit 410, a delta-reset sampling circuit 420 (DRS), a control circuit (control block) 430, and a DA conversion circuit 440 (DAC).

The integration circuit 410 is a circuit that integrates an output current IOUT (current output signal) from the sensor 91, and is configured with a capacitor CINT, a switch SW3, and an operational amplifier OPAMP1. A column line 92 is connected to an inverting input terminal of the operational amplifier OPAMP1, which is also an input terminal of the analog front end 400. The switch SW3 and the capacitor CINT are disposed in parallel between the inverting input terminal of the operational amplifier OPAMP1 and an output terminal of the operational amplifier OPAMP1. The switch SW3 is a switch that resets the capacitor CINT. The integration circuit 410 is a transimpedance amplifier that converts an output current IOUT (current output signal) from the sensor 91 into a voltage signal.

The delta-reset sampling circuit 420 (DRS) is connected to the output terminal of the operational amplifier OPAMP1. The delta-reset sampling circuit 420 (DRS) is a circuit that calculates a difference between outputs of the integration circuit 410 at two different points in time.

The DA conversion circuit 440 (DAC) is a circuit that controls a bias voltage $VBIAS_{IN}$ of an output signal line from the sensor 91 through an input terminal of the analog front end 400. The bias voltage of the output signal line from the sensor 91 is also a bias voltage of an output terminal of the sensor 91. The control circuit 430 is a circuit that provides an input signal $DIN_{BIAS}$ to the DA conversion circuit 440 (DAC). An output of the control circuit 430 is input to the DA conversion circuit 440 (DAC) as an input signal $DIN_{BIAS}$ to the DA conversion circuit 440 (DAC). Further, an output of the DA conversion circuit 440 (DAC) is input to a non-inverting input terminal of the operational amplifier OPAMP1 as a bias voltage $VBIAS_{AMP}$. The DA conversion circuit 440 (DAC) is also a variable bias voltage generation circuit that generates a voltage in response to a signal from the control circuit 430.

(Operation and Effect of Analog Front End)

Figure 1:
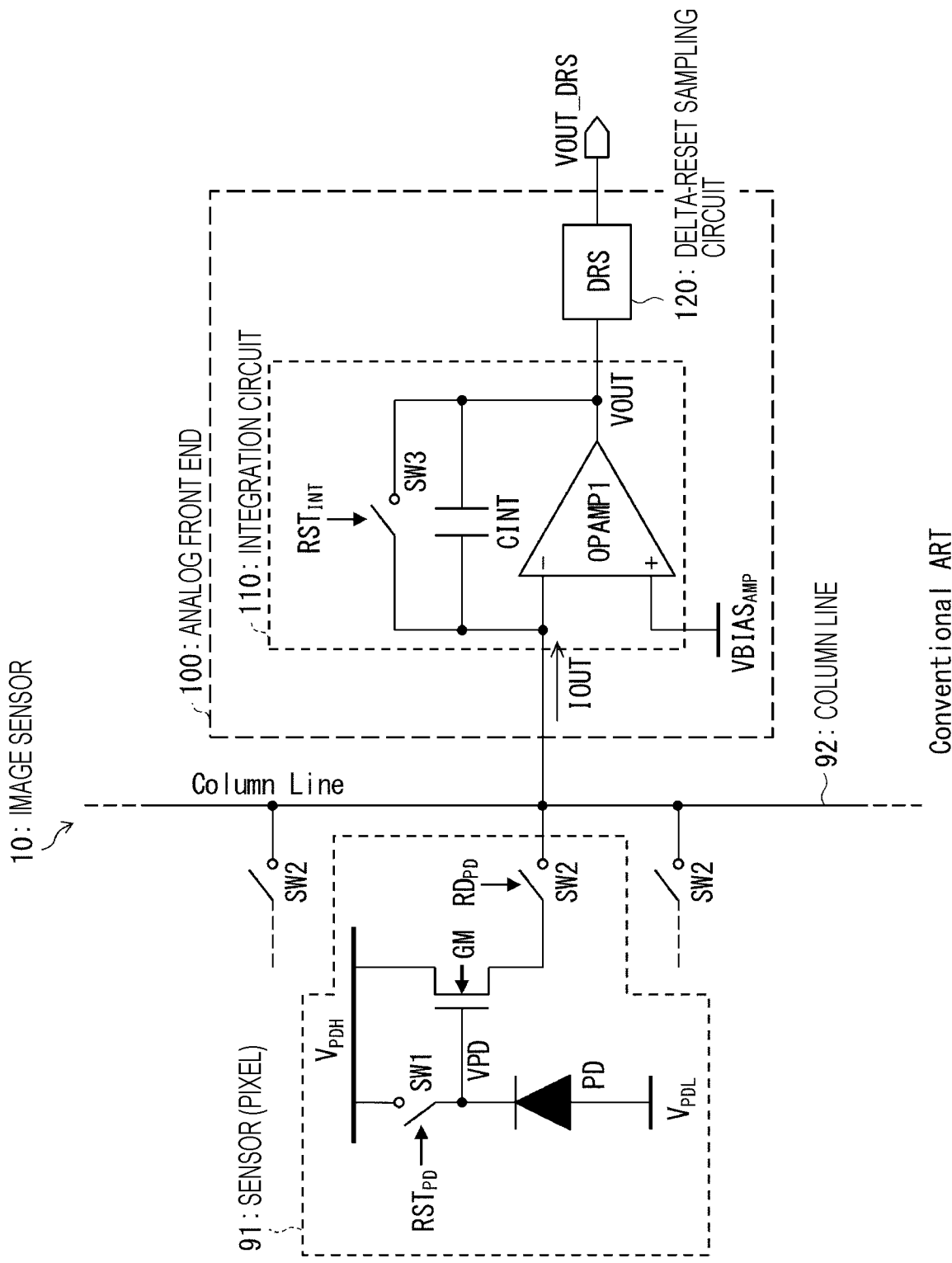
FIG. 1 is a circuit diagram of an image sensor including an analog front end of the related art.
Figure 2:
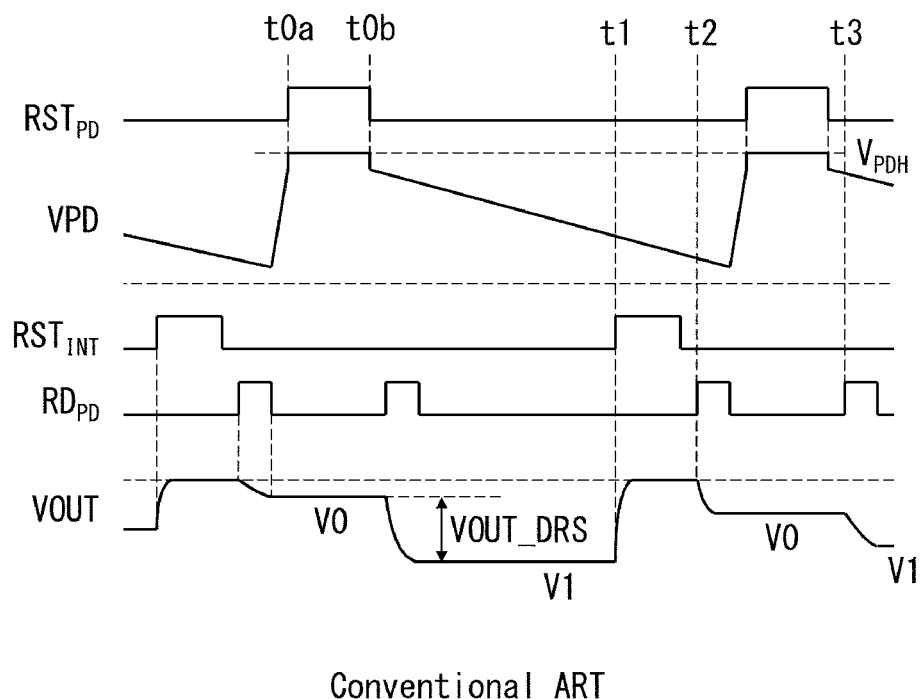
FIG. 2 is a timing chart illustrating an operation of the image sensor including the analog front end of the related art.

Timing of an operation of an image sensor which uses the analog front end 400 is similar to a case of the image sensor of the related art illustrated in FIG. 1. Hence, an operation of the analog front end 400 will be described with reference to FIG. 2 which is a timing chart of an operation of the image sensor of the related art.

In the sensor 91, the control signal $RST_{PD}$ of the switch SW1 becomes high, and the switch SW1 is turned on at time t0a. Then, the cathode is biased to the bias voltage $V_{PDH}$, and the photodiode PD is reset (reset period). Next, the reset signal $RST_{PD}$ becomes low at time t0b, and the switch SW1 is turned off. Then, the cathode of the photodiode PD enters a floating state, and the light charges generated by light reception can be accumulated in the cathode. Consequently, the cathode voltage VPD drops according to the amount of accumulated light charges.

In the analog front end 400, the control signal $RST_{INT}$ of the switch SW3 temporarily becomes high and the switch SW3 is turned on at time t1. Then, the charges of the capacitor CINT of the analog front end 400 are reset to zero.

In order for the sensor 91 to read the light charge signal of the photodiode PD in which the light charges are accumulated during a period from time t0b to time t2, the control signal $RD_{PD}$ of the switch SW2 temporarily becomes high at time t2 (light charge signal read period). Then, the switch SW2 is turned on, and a current depending on the cathode voltage VPD is output to the integration circuit 410 of the analog front end 400 through the transistor GM. In the analog front end 400, an output VOUT of the integration circuit 410 becomes a voltage V0. The voltage V0 is a voltage corresponding to the light charge signal of the photodiode PD according to the accumulated light charge.

Thereafter, in order for the sensor 91 to detect the amount of light during a next accumulation period, the cathode is temporarily biased to the bias voltage $V_{PDH}$, and the photodiode PD is reset. At time t3 immediately after the reset, the control signal $RD_{PD}$ of the switch SW2 becomes high and the switch SW2 is turned on. Then, in the analog front end 400, an output current corresponding to a value of the cathode voltage VPD immediately after the reset is integrated by the integration circuit 410. As a result, the output VOUT of the integration circuit 410 becomes V1. The voltage V1 is a voltage corresponding to a state of the photodiode PD immediately after the reset.

In this manner, in the analog front end 400, the integration circuit 410 outputs the voltage V1 and the voltage V0, which are outputs of the integration circuit at two different points in time, to the output VOUT in cooperation with operation timing of the sensor 91.

The delta-reset sampling circuit 420 (DRS) outputs a difference V1−V0 between voltage outputs of the integration circuit 410 at two different points in time. The difference V1−V0 between the voltage outputs is a voltage signal corresponding to the light charges accumulated in the cathode of the photodiode PD from time t0b to time t2, from which low frequency noise and DC offset components from the transistor GM and the like are removed. In this manner, the difference V1−V0 between the voltage outputs of the integration circuit 410 is output as an output VOUT_DRS of the analog front end 400.

The control circuit 430 detects a parameter group representing states of the respective sensors 91 and controls a bias voltage $VBIAS_{AMP}$ of the non-inverting input terminal of the operational amplifier OPAMP1 through the DA conversion circuit 440 (DAC) such that current outputs from each sensor 91 have desirable characteristics. At this time, the integration circuit 410 biases a current signal input terminal (inverting input terminal of the operational amplifier OPAMP1) of the integration circuit 410 to a voltage equal to or close to the bias voltage $VBIAS_{AMP}$ of the non-inverting input terminal of the operational amplifier OPAMP1. Here, a bias voltage of the current signal input terminal of the integration circuit 410 is also a bias voltage $VBIAS_{IN}$ of an output signal line (bias voltage of the column line 92) from the sensor. By this operation, a level of an output current from the source terminal of the transistor GM can be adjusted. Therefore, a variation of the output transistor GM and a characteristic variation of the photodiode PD can be corrected.

Here, the control circuit 430 may use a parameter group representing states/characteristics of the respective sensors 91 previously detected and measured or may use a parameter group representing the states of the sensors 91 during reading of a signal from the sensor 91 or during reset.

Figure 3:
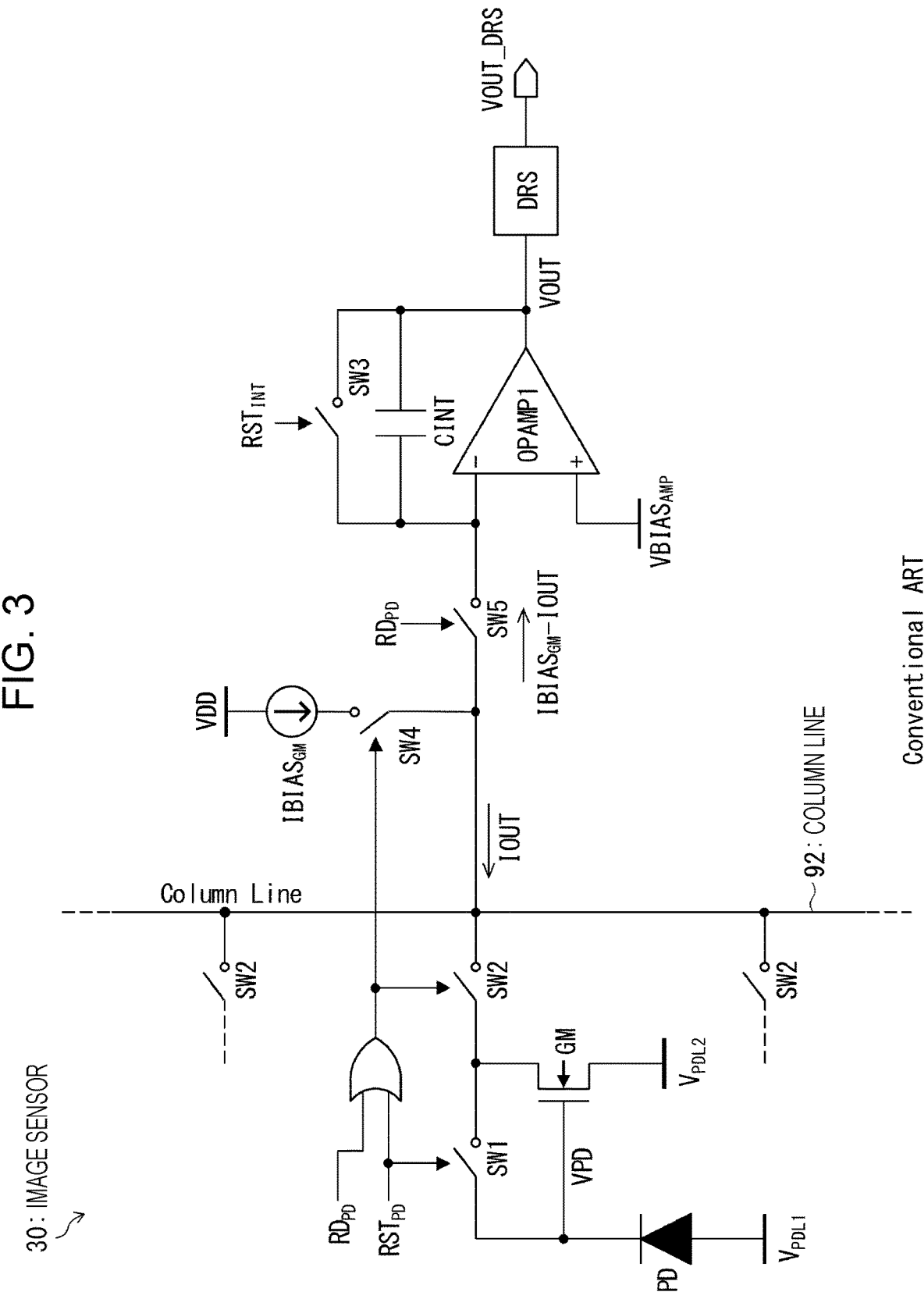
FIG. 3 is a circuit diagram of an image sensor including an analog front end of the related art.

Unlike the related art illustrated in FIG. 3, there is no problem that a large parasitic capacitance is added during a reset period of the photodiode PD and it takes time to reset the photodiode PD.

Therefore, according to the analog front end 400 of Embodiment 1, it is possible to correct a difference in characteristics between sensors, such as a variation of the output transistor GM or a characteristic variation of the photodiode PD, without reduction of an operation speed.

In Embodiment 1, in a case where noise removal is not demanded by calculating a difference between signals at two different points in time using the delta-reset sampling technique, the delta-reset sampling circuit 420 (DRS) can also be omitted.

Embodiment 2

Embodiment 2 of the present invention will be described below. A member having the same function as the member described in the above-described embodiment will be denoted by the same reference numerals for the sake of convenience of the description, and description thereof will not be repeated.

(Configuration of Image Sensor Provided with Analog Front End)

Figure 5:
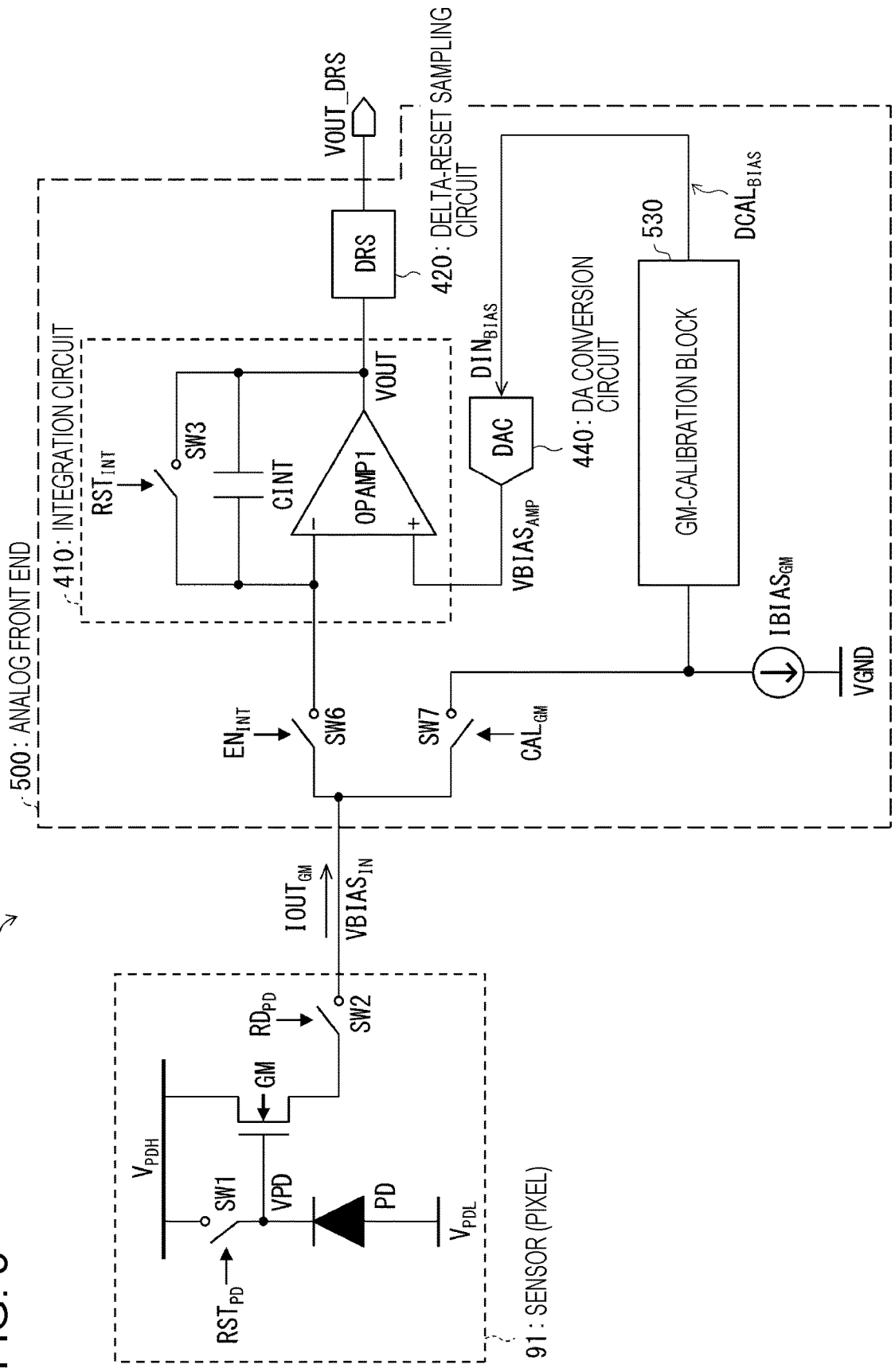
FIG. 5 is a circuit diagram of an image sensor to which an analog front end according to Embodiment 2 is applied.

FIG. 5 is a diagram illustrating a circuit configuration example of an image sensor 50 to which an analog front end 500 according to Embodiment 2 is applied. Also, FIG. 5 simultaneously illustrates the sensor 91 in addition to the analog front end 500. The plurality of sensors 91 are connected to one analog front end 500 through one column line in the same manner as in the image sensor 40 illustrated in FIG. 4. However, FIG. 5 illustrates only one sensor 91 and does not illustrate the column line.

The configuration of the sensor 91 is the same as the case of Embodiment 1.

(Configuration of Analog Front End)

The analog front end 500 includes the integration circuit 410, the delta-reset sampling circuit 420 (DRS), a GM-calibration block 530, and the DA conversion circuit 440 (DAC) in the same manner as the analog front end 400 according to Embodiment 1. Here, the GM-calibration block 530 is a circuit as a specific example of the control circuit 430 according to Embodiment 1. An output $DCAL_{BIAS}$ of the GM-calibration block 530 can be an input signal $DIN_{BIAS}$ to the DA conversion circuit 440 (DAC). The integration circuit 410, the delta-reset sampling circuit 420 (DRS), and the DA conversion circuit 440 (DAC) are the same as those in Embodiment 1. Further, a connection between the integration circuit 410, the delta-reset sampling circuit 420 (DRS), and the DA conversion circuit 440 (DAC) is the same as the connection of Embodiment 1.

The analog front end 500 further includes a switch SW6, a switch SW7, and a current source $IBIAS_{GM}$. The switch SW6 is disposed between the output (column line) of the sensor 91 and the inverting input terminal of the integration circuit 410. The switch SW7 is disposed between the output (column line) of the sensor 91 and an input terminal of the GM-calibration block 530. Control signals of the switch SW6 and the switch SW7 are a control signal $EN_{INT}$ and a control signal $CAL_{GM}$, respectively. A connection portion between the switch SW7 and the input terminal of the GM-calibration block 530 is connected to a ground VGND through the current source $IBIAS_{GM}$.

When a signal corresponding to the accumulated light charges from the sensor 91 is read by the integration circuit 410, the switch SW6 is turned on and the switch SW7 is turned off. That is, the control signal $EN_{INT}$ of the switch SW6 is high, and the control signal $CAL_{GM}$ of the switch SW7 is low. Meanwhile, when the GM-calibration block 530 calculates a correction value of an output current from the sensor 91, the switch SW6 is turned off and the switch SW7 is turned on. That is, the control signal $EN_{INT}$ of the switch SW6 is low, and the control signal $CAL_{GM}$ of the switch SW7 is high. At this time, the output terminal of the sensor 91 is connected to the GM-calibration block 530.

(Circuit Configuration Example of Gm-Calibration Block)

Figure 6:
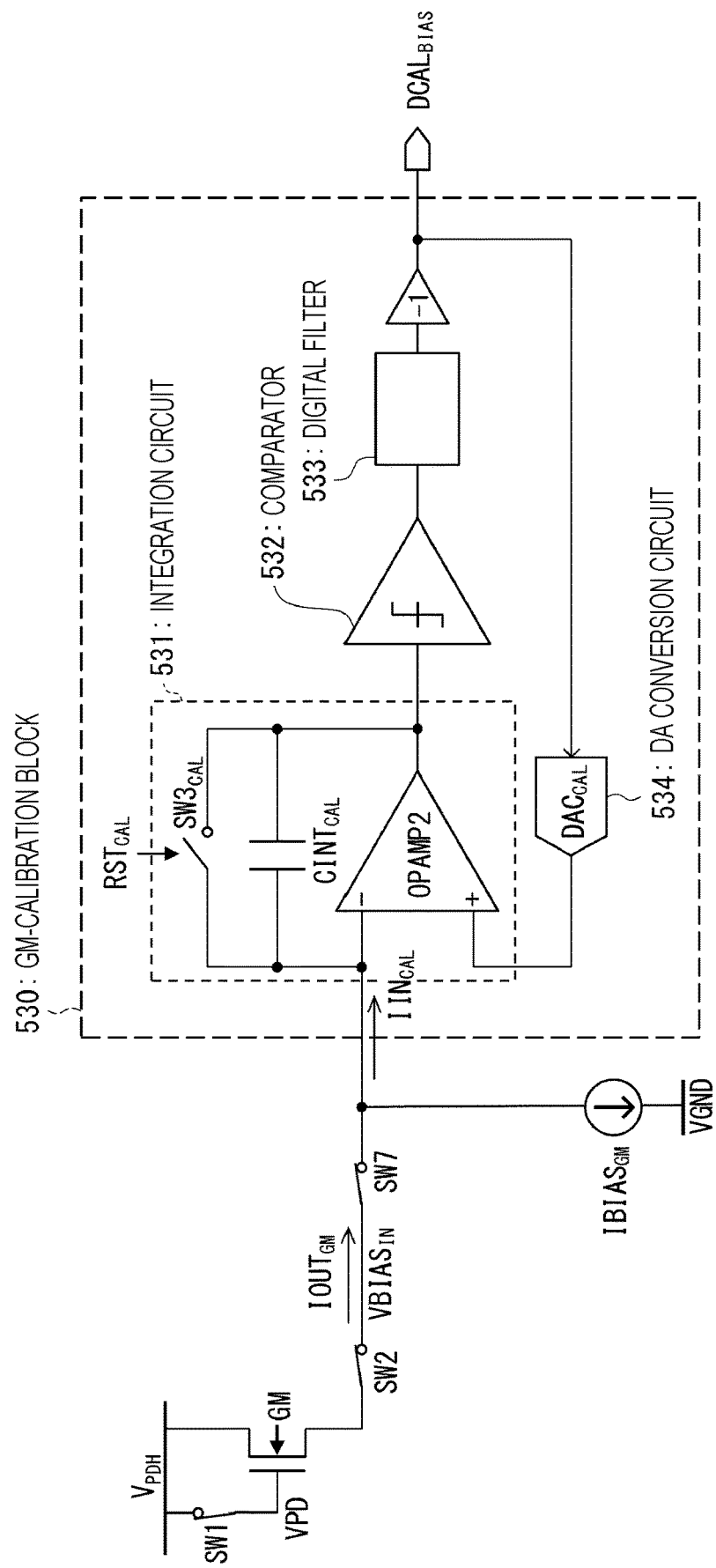
FIG. 6 is a circuit diagram illustrating a control circuit of the analog front end according to Embodiment 2.

A circuit configuration example of the GM-calibration block 530 is illustrated in FIG. 6. A part of the image sensor 50 is also suitably illustrated in FIG. 6 in addition to the GM-calibration block 530.

The GM-calibration block 530 adjusts a bias voltage $VBIAS_{IN}$ of an output signal line from a sensor such that an output current $IOUT_{GM}$ from the sensor 91 converges to a desirable value $IBIAS_{GM}$ when the switch SW1 of the sensor 91 is turned on ($RST_{PD}$=high) and the photodiode PD is reset. To adjust the bias voltage $VBIAS_{IN}$ of the output signal line from the sensor is performed by controlling the bias voltage $VBIAS_{AMP}$ of the non-inverting input terminal of the operational amplifier OPAMP1 through the DA conversion circuit 440 (DAC) by an output $DCAL_{BIAS}$ of a feedback loop of the GM-calibration block 530. As will be described below, only during this period, the control signal $CAL_{GM}$ of the switch SW7 becomes high, the switch SW7 is turned on, the control signal $EN_{INT}$ of the switch SW6 is low, and the switch SW6 maintains a turn-off state.

The GM-calibration block 530 is configured with an integration circuit 531, a comparator 532, a digital filter 533, and a DA conversion circuit 534 ($DAC_{CAL}$). The integration circuit 531 is configured with an operational amplifier OPAMP2, a capacitor $CINT_{CAL}$, and a switch $SW3_{CAL}$. The integration circuit 531 is a current integration circuit for detecting a current flowing through an output signal line from the sensor 91 when an output current from the sensor 91 is corrected. An inverting input terminal of the operational amplifier OPAMP2 is also an input terminal of the GM-calibration block 530 and is connected to the switch SW7. The capacitor $CINT_{CAL}$ and the switch $SW3_{CAL}$ are disposed in parallel between the inverting input terminal of the operational amplifier OPAMP2 and an output terminal of the operational amplifier OPAMP2. The switch $SW3_{CAL}$ is a switch for resetting the integration circuit 531.

The comparator 532 connected to an output terminal of the integration circuit 531 is a circuit for converting an output of the integration circuit 531 into a one-bit digital value. The digital filter 533 connected to an output terminal of the comparator 532 is a circuit for appropriately filtering an output of the comparator 532 and generating an output $DCAL_{BIAS}$ of a feedback loop which is a multi-bit output. The DA conversion circuit 534 ($DAC_{CAL}$) connected to an output terminal of the digital filter 533 is a circuit for converting the output $DCAL_{BIAS}$ of the feedback loop into an analog voltage and adjusting the bias voltage $VBIAS_{IN}$ of the output signal line from the sensor. An output terminal of the DA conversion circuit 534 ($DAC_{CAL}$) is connected to a non-inverting input terminal of the operational amplifier OPAMP2. Therefore, the integration circuit 531, the comparator 532, the digital filter 533, and the DA conversion circuit 534 ($DAC_{CAL}$) configure the feedback loop.

Next, a calculation of a correction value of the output current from the sensor 91 which is performed by the GM-calibration block 530 will be described. In the sensor 91, when the switch SW1 is turned on and the photodiode PD is reset, the switches SW2 and SW7 are also turned on, and the feedback loop is set to be active. At this time, an output current $IOUT_{GM}$ from the sensor 91 is represented by a following equation.

$$IOUT_{GM} = \frac{1}{2}\mu_{GM}C_{OX}\frac{W}{L}(V_{PDH} - VBIAS_{IN} - VTH_{GM})^2 \quad \text{[Equation 1]}$$

Here, $\mu_{GM}$, $C_{OX}$, W, L, and $VTH_{GM}$ are a mobility, a gate capacitance per unit area, a channel width, a channel length, and a threshold voltage of the transistor GM, respectively.

A following current $IIN_{CAL}$ is input to the integration circuit 531.

$$IIN_{CAL} = IOUT_{GM} - IBIAS_{GM} \quad \text{[Equation 2]}$$

Here, $IBIAS_{GM}$ is a current flowing through a current source $IBIAS_{GM}$.

The feedback loop set to be active adjusts an output current $IOUT_{GM}$ from the sensor 91 through a bias voltage $VBIAS_{IN}$ of the output signal line from the sensor and makes a current $IIN_{CAL}$ which is an input to the integration circuit 531 converge to zero. That is, a bias voltage $VBIAS_{IN}$ of the output signal line from the sensor is adjusted such that the output current $IOUT_{GM}$ from the sensor 91 becomes equal to a current $IBIAS_{GM}$ flowing through the current source $IBIAS_{GM}$. An output $DCAL_{BIAS}$ of the feedback loop, which is a digital value converged in this manner, is set as a correction value at the time of reading a light current signal of the sensor via the integration circuit 410. In this case, the correction value is applied to an input signal $DIN_{BIAS}$ of the DA conversion circuit 440 (DAC). Then, the bias voltage $VBIAS_{IN}$ of the output signal line from the sensor is corrected such that the output current $IOUT_{GM}$ from the sensor 91 becomes the steady value $IBIAS_{GM}$ (while the photodiode PD is reset) through the bias voltage $VBIAS_{AMP}$ of the non-inverting input terminal of the operational amplifier OPAMP1. Therefore, it is possible to reduce characteristic variations of the sensors 91 configuring the image sensor 50.

(Operation and Effect of Analog Front End)

Figure 7:
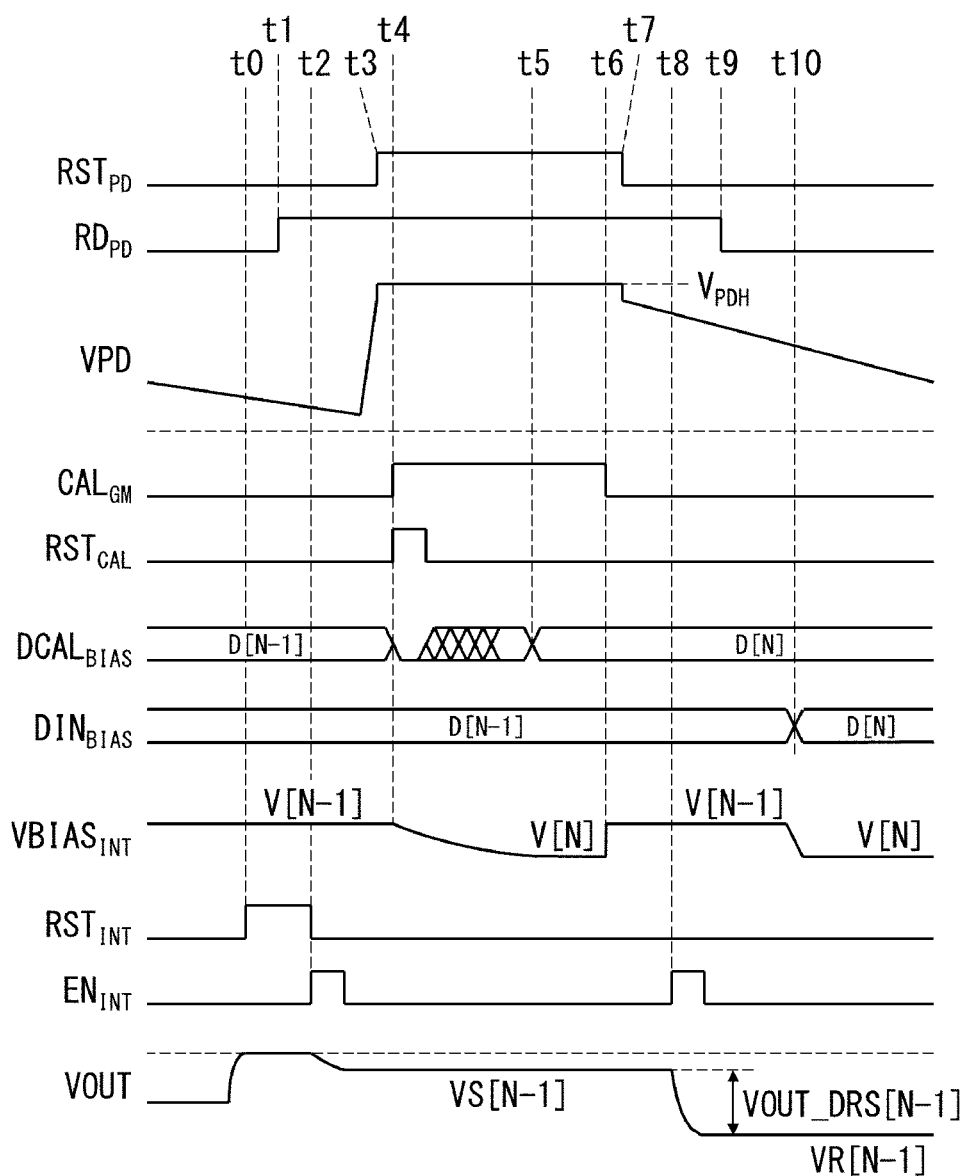
FIG. 7 is a timing chart illustrating an operation of the analog front end according to Embodiment 2.

A timing chart of an operation of the analog front end 500 illustrated in FIGS. 5 and 6 is illustrated in FIG. 7. The respective times t0, t1, t2, t3, t4, t5, t6, t7, t8, t9, and t10 are times arranged in this order in time series. Hereinafter, the operation of the analog front end 500 will be described with reference to FIG. 7.

At time t3, the control signal $RST_{PD}$ of the switch SW1 becomes high, and the cathode voltage VPD of the photodiode PD is reset to the bias voltage $V_{PDH}$. At time t4 immediately after the reset, the control signal $CAL_{GM}$ of the switch SW7 becomes high, and the source terminal of the transistor GM, which is also the output terminal of the sensor 91, is connected to the GM-calibration block 530 through the switch SW2 and the switch SW7. Furthermore, the control signal $RST_{CAL}$ of the switch $SW3_{CAL}$ becomes high, the switch $SW3_{CAL}$ is turned on, and the charges held in the capacitor $CINT_{CAL}$ of the integration circuit 531 are reset.

Thereafter, by time t5, if the switch $SW3_{CAL}$ is released from conduction and turned off ($RST_{CAL}$=low), the integration circuit 531 starts integration of the current $IIN_{CAL}$ input to the GM-calibration block 530. While the control signal $CAL_{GM}$ of the switch SW7 is high, the feedback loop operates such that the output of the integration circuit 531 approaches zero. That is, the bias voltage $VBIAS_{IN}$ of the output signal line from the sensor is adjusted through the DA conversion circuit 534 ($DAC_{CAL}$) such that the current $IIN_{CAL}$ input to the GM-calibration block 530 becomes zero. At time t5, the output $DCAL_{BIAS}$ of the feedback loop converges to a value D[N], and the bias voltage $VBIAS_{IN}$ of the output signal line from the sensor converges to a voltage V[N]. At time t6, the control signal $CAL_{GM}$ of the switch SW7 becomes low, the GM-calibration block 530 is disconnected from the sensor 91, and the calculation of the correction value ends.

Meanwhile, an operation timing of reading by the integration circuit 410 illustrated in FIG. 5 is as follows.

From time t0 to time t2, the control signal $RST_{INT}$ of the switch SW3 becomes high, and the capacitor CINT of the integration circuit 410 is reset. During a period from time t2 to time before time t3, the control signal $EN_{INT}$ of the switch SW6 becomes high, the output current $IOUT_{GM}$ from the sensor 91 is integrated by the integration circuit 410 during this period, and the signal of the sensor 91 is read. By this operation, the output VOUT of the integration circuit 410 becomes a voltage VS[N−1].

Thereafter, while the control signal $CAL_{GM}$ of the switch SW7 is high, the switch SW6 is turned off ($EN_{INT}$=low), and the integration circuit 410 is disconnected from the sensor 91. After the period in which the control signal $CAL_{GM}$ of the switch SW7 becomes high and the correction value is calculated by the GM-calibration block 530 ends at time t6, the output current $IOUT_{GM}$ from the sensor 91 immediately after the reset is read. Accordingly, at time t8, the control signal $EN_{INT}$ of the switch SW6 becomes high, and the output current $IOUT_{GM}$ from the sensor 91 is integrated by the integration circuit 410. Then, the output VOUT of the integration circuit 410 changes from the voltage VS[N−1] to a voltage VR[N−1]. Since the delta-reset sampling circuit 420 (DRS) calculates a difference VR[N−1]−VS[N−1] of the voltage outputs, an output from which extra noise components are removed is obtained. Here, the noise components to be removed are a DC offset component due to charge injection mixed into the cathode of the photodiode PD through the switch SW1, a low frequency noise component of the transistor GM, and the like.

At the time of such two-time integrations, which are performed by the integration circuit 410, of the output current $IOUT_{GM}$ from the same sensor 91, it is preferable that the bias voltages $VBIAS_{IN}$ of the output signal line from the sensor are the same. Therefore, at time t2 and time t8, the same digital value D[N−1] is set to the input signal $DIN_{BIAS}$ to the DA conversion circuit 440 (DAC) such that the bias voltages $VBIAS_{IN}$ of the output signal line from the sensor become the same voltage V[N−1]. A value D[N] calculated between time t4 and time t6 is set as the input signal $DIN_{BIAS}$ to the DA conversion circuit 440 (DAC) at an appropriate time t10 after the end of the second integration starting from time t8. In this manner, the bias voltage $VBIAS_{IN}$ of the output signal line from the sensor is updated to the voltage V[N].

In the analog front end 500, the control signal $RD_{PD}$ of the switch SW2 is set to high between time t1 and time t9 and the switch SW2 is held in a turn-on state to perform reading of the output current $IOUT_{GM}$ from the sensor 91 by the integration circuit 410 and perform correction calculation by the GM-calibration block 530.

Also in Embodiment 2, unlike the related art illustrated in FIG. 3, there is no problem that a large parasitic capacitance is added during the reset period of the photodiode PD and it takes time to reset the photodiode PD.

Therefore, according to the analog front end 500 of Embodiment 2, it is possible to correct a difference in characteristics between sensors, such as a variation of the output transistor GM or a characteristic variation of PD, without reduction of an operation speed.

Further, in the analog front end 500, the integration circuit 410 and the integration circuit 531 are not connected to the sensor 91 ($EN_{INT}$=low, $CAL_{GM}$=low) during a period in which transitions of the control signal $RST_{PD}$ of the switch SW1 and the control signal $RD_{PD}$ of the switch SW2 of the sensor 91 are made from high to low or low to high. Therefore, saturations or malfunctions of the integration circuit 410 and the integration circuit 531 due to charge injection caused by the switch SW1 or the switch SW2 of the sensor 91 are prevented.

In the analog front end 500, since the output current $IOUT_{GM}$ from the sensor 91 is periodically corrected, a time-series change in characteristic of the sensor 91 due to temperature or stress can also be corrected.

In the analog front end 500, an integration period of the output current $IOUT_{GM}$ from the sensor 91 is controlled by the control signal $EN_{INT}$ of the switch SW6 which is a signal inside the analog front end 500. Therefore, when compared with the analog front end 100 of FIG. 1 in which the integration period of the output current $IOUT_{GM}$ from the sensor 91 is controlled by the control signal $RD_{PD}$ of the switch SW2 which is an internal signal of the sensor 91, timing-jitter of the integration period is reduced, and the analog front end 500 has lower noise characteristic. This is because a line of the control signal $RD_{PD}$ of the switch SW2 of the sensor 91 in the image sensor 10 of FIG. 1 is long and noise is easily mixed.

Since the analog front end 500 uses a delta-reset sampling technique, it is possible to reduce influences of the charge injection offset noise component mixed from the switch SW1 of the sensor 91 and a low frequency noise $VTH_{NOISE}$ generated by the transistor GM.

In Embodiment 2, although the configuration of the GM-calibration block 530 is made by a feedback loop configured by using the integration circuit 531 and the comparator 532, another configuration such as a configuration which uses a multi-bit AD conversion circuit may be used.

Embodiment 3

A circuit configuration example of an image sensor to which an analog front end according to Embodiment 3 is applied is the same as the case of Embodiment 2 illustrated in FIG. 5. The circuit configuration example of the GM-calibration block of the analog front end according to Embodiment 3 is the same as the case of Embodiment 2 illustrated in FIG. 6.

As illustrated in FIG. 7, the analog front end 500 according to Embodiment 2 performs a correction calculation of the output current $IOUT_{GM}$ from the sensor 91 through the bias voltage $VBIAS_{IN}$ of the output signal line from the sensor during the reset period ($RST_{PD}$=high) of the photodiode PD.

Meanwhile, in the analog front end according to Embodiment 3, the correction calculation of the output current $IOUT_{GM}$ from the sensor 91 is performed through the bias voltage $VBIAS_{IN}$ of the output signal line from the sensor immediately after an end of the reset period of the photodiode PD. Then, after the bias voltage $VBIAS_{IN}$ of the output signal line from the sensor is updated to the voltage V[N] corresponding to the calculated correction value, the integration circuit 410 reads the output current $IOUT_{GM}$ from the sensor 91.

Figure 8:
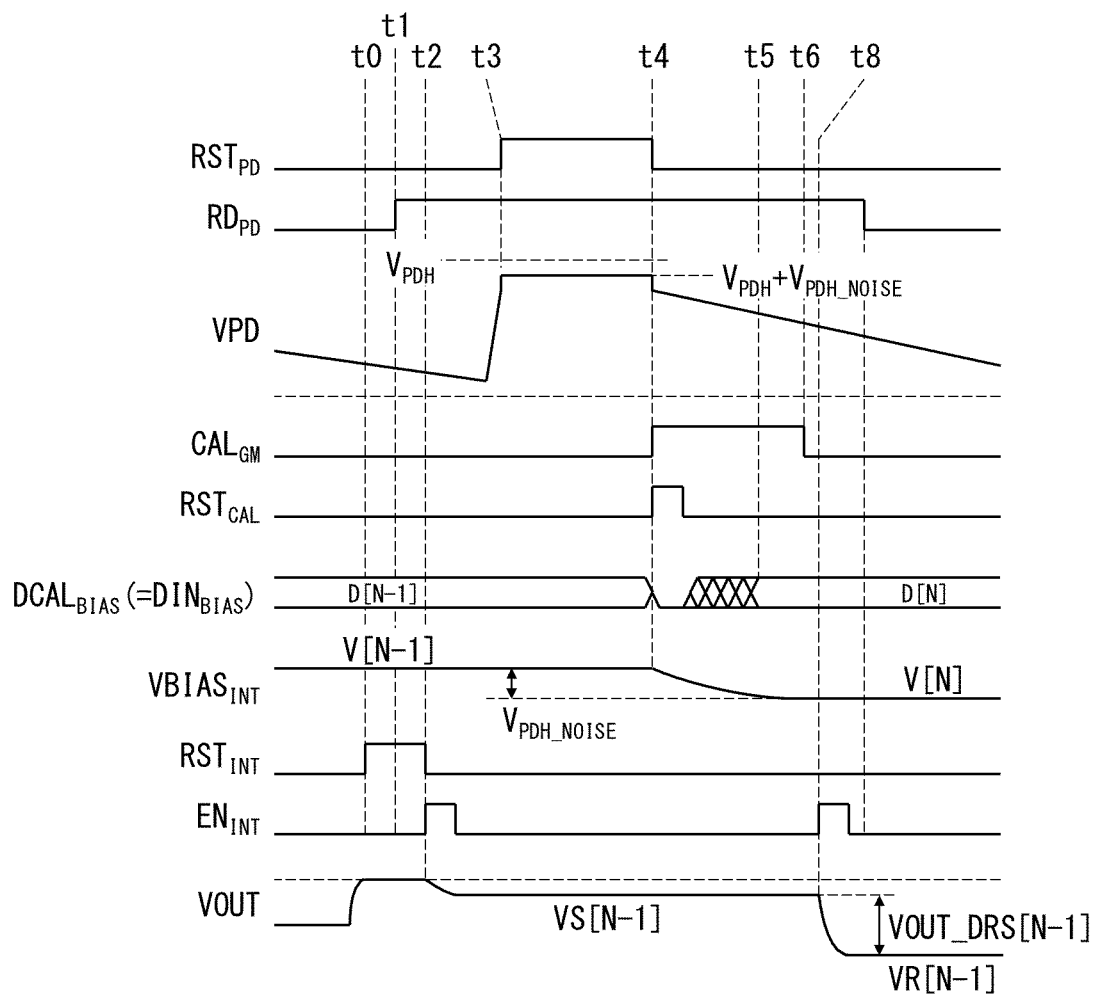
FIG. 8 is a timing chart illustrating an operation of an analog front end according to Embodiment 3.

FIG. 8 illustrates a timing chart of an operation of the analog front end according to Embodiment 3. The respective times t0, t1, t2, t3, t4, t5, t6, t7, and t8 are times arranged in this order in time series. Hereinafter, details of the operation of the analog front end according to Embodiment 3 will be described with reference to FIG. 8.

At time t3, the control signal $RST_{PD}$ of the switch SW1 becomes high, and the cathode voltage VPD of the photodiode PD is reset to the bias voltage $V_{PDH}$. Thereafter, at time t4, the control signal $RST_{PD}$ of the switch SW1 becomes low, the switch SW1 is turned off, and the reset of the photodiode PD is released. Further, the control signal $CAL_{GM}$ of the switch SW7 becomes high, and the source terminal of the transistor GM which is also the output terminal of the sensor 91 is connected to the GM-calibration block 530 through the switch SW2 and the switch SW7. Further, the control signal $RST_{CAL}$ of the switch $SW3_{CAL}$ becomes high, the switch $SW3_{CAL}$ is turned on, and the charges held in the capacitor $CINT_{CAL}$ of the integration circuit 531 is reset.

Thereafter, by time t5, if the switch $SW3_{CAL}$ is released from conduction and is turned off ($RST_{CAL}$=low), the integration circuit 531 starts integration of the current $IIN_{CAL}$ input to the GM-calibration block 530. While the control signal $CAL_{GM}$ of the switch SW7 is high, the feedback loop operates such that the output of the integration circuit 531 approaches zero. That is, the bias voltage $VBIAS_{IN}$ of the output signal line from the sensor is adjusted through the DA conversion circuit 534 ($DAC_{CAL}$) and the integration circuit 531 such that the current $IIN_{CAL}$ input to the GM-calibration block 530 becomes zero. At time t5, the output $DCAL_{BIAS}$ of the feedback loop converges to the value D[N], and the bias voltage $VBIAS_{IN}$ of the output signal line from the sensor converges to the voltage V[N]. At time t6, the control signal $CAL_{GM}$ of the switch SW7 becomes low, the GM-calibration block 530 is disconnected from the sensor 91, and the calculation of the correction value ends.

Meanwhile, a read operation timing of the integration circuit 410 is as follows.

From time t0 to time t2, the control signal $RST_{INT}$ of the switch SW3 becomes high, and the capacitor CINT of the integration circuit 410 is reset. During a period from time t2 to time before time t3, the control signal $EN_{INT}$ of the switch SW6 becomes high, the output current $IOUT_{GM}$ from the sensor 91 during this period is integrated by the integration circuit 410, and a signal of the sensor 91 is read. By this operation, the output VOUT of the integration circuit 410 becomes the voltage VS[N−1].

Thereafter, while either of the control signal $RST_{PD}$ of the switch SW1 or the control signal $CAL_{GM}$ of the switch SW7 is high, the switch SW6 is turned off ($EN_{INT}$=low), and the integration circuit 410 is disconnected from the sensor 91. After a period in which the control signal $CAL_{GM}$ of the switch SW7 becomes high and the calculation of the correction value by the GM-calibration block 530 ends at time t6, the output current $IOUT_{GM}$ from the sensor 91 is read. Accordingly, at time t8, the control signal $EN_{INT}$ of the switch SW6 becomes high, and the output current $IOUT_{GM}$ from the sensor 91 is integrated by the integration circuit 410. Then, the output VOUT of the integration circuit 410 changes from the voltage VS[N−1] to the voltage VR[N−1]. Since the delta-reset sampling circuit 420 (DRS) calculates a difference VR[N−1]−VS[N−1] between the voltage outputs, an output from which extra noise components are removed is obtained. Here, the noise components to be removed are charge injection and the like that are mixed into the cathode of the photodiode PD through the switch SW1.

As will be described below, it is preferable that, before the output current $IOUT_{GM}$ from the sensor 91 is integrated by the integration circuit 410 and is read from time t8, the value D[N], which is the calculated correction value, is applied to the input signal $DIN_{BIAS}$ to the DA conversion circuit 440 (DAC), and the bias voltage $VBIAS_{IN}$ of the output signal line from the sensor is set to a bias voltage value in which influence of the noise and the like are reflected.

An image sensor for X-ray detection, a panel for X-ray detection, and the like are generally large, and a bias line (wire for transmitting the bias voltage $V_{PDH}$) for resetting the photodiode PD and a line of the reset signals (control signal $RST_{PD}$ of the switch SW1) are long. Therefore, in addition to a circuit noise of a voltage generation circuit and a driver itself, an external noise is easily mixed. The cathode voltage VPD of the photodiode PD is deviated from an ideal value and becomes $V_{PDH}+V_{PDH\_NOISE}$, immediately after the reset period of the photodiode PD ends (time t4). The noise component VPDH_NOISE is due to such noise components and kTC noise generated when the switch SW1 of the sensor 91 changes from on to off.

Further, a MOS transistor generally has a low frequency noise and can be represented, for example, as a low frequency fluctuation $VTH_{NOISE}$ of a threshold voltage. A threshold voltage of the transistor GM immediately after the photodiode PD is reset can be represented as $VTH_{GM}+VTH_{NOISE}$. Therefore, the output current $IOUT_{GM}$ from the sensor 91 can be represented by the following equation which clearly illustrates influence of the reset noise $V_{PDH\_NOISE}$ mixed at the time of resetting of the photodiode PD and the low frequency noise $VTH_{NOISE}$ of the transistor GM.

$$IOUT_{GM} = \frac{1}{2}\mu_{GM}C_{OX}\frac{W}{L}$$
$$(V_{PDH} - V_{PDH\_NOISE} - VBIAS_{IN} - VTH_{GM} - VTH_{NOISE})^2$$

[Equation 3]

The analog front end according to Embodiment 3 updates the bias voltage $VBIAS_{IN}$ of the output signal line from the sensor before the output current $IOUT_{GM}$ from the sensor 91 is read at time t8 and immediately after the reset period of the photodiode PD ends (time t4). That is, the output current $IOUT_{GM}$ from the sensor 91 influenced by the noise of the above equation is corrected to the specified value $IBIAS_{GM}$ through the bias voltage $VBIAS_{IN}$. Therefore, influence of the noise component $V_{PDH\_NOISE}$ of the cathode voltage of the photodiode PD and the low frequency noise $VTH_{NOISE}$ of the threshold voltage of the transistor GM can also be reduced.

As described above, also in the analog front end according to Embodiment 3, the same effect as in the analog front end according to Embodiment 2 can be obtained by the above-described configuration.

Furthermore, in Embodiment 3, an analog front end, which can reduce the influence of the low frequency noise $VTH_{NOISE}$ of the threshold voltage of the transistor GM and is less susceptible to noise, is realized.

In each of the above-described embodiments, the output signal from the sensor 91 is described as the output current IOUT or $IOUT_{GM}$ that is a current output signal. However, since the current signal is represented by a time change or differentiation of a charge signal, the current signal can be regarded as a charge signal in a case where the integration period by the integration circuit is defined to have a steady value. Therefore, even if the signal from the sensor 91 is a charge output signal, the signal operates in the same manner as the current output signal. Therefore, even in a case where the output signal from the sensor 91 is the charge output signal, the present invention can be similarly applied to the case.

In each of the above-described embodiments, the respective integration circuits 410 and 531 can be referred to as a transimpedance amplifier in the sense that a capacitive impedance is disposed in a feedback portion of an operational amplifier. In each of the above-described embodiments, the respective integration circuits 410 and 531 may be a transimpedance amplifier configured with a resistor and an operational amplifier. That is, the capacitor CINT may be replaced with a resistance element in the respective integration circuits 410 and 531.

REFERENCE SIGNS LIST

40, 50 IMAGE SENSOR
91 SENSOR
92 COLUMN LINE (OUTPUT SIGNAL LINE)
400, 500 ANALOG FRONT END
410, 531 INTEGRATION CIRCUIT
420 (DRS) DELTA-RESET SAMPLING CIRCUIT
430 CONTROL CIRCUIT
440 (DAC) DA CONVERSION CIRCUIT
530 GM-CALIBRATION BLOCK
532 COMPARATOR
533 DIGITAL FILTER
534 ($DAC_{CAL}$) DA CONVERSION CIRCUIT
IOUT, $IOUT_{GM}$ OUTPUT CURRENT (CURRENT OUTPUT SIGNAL) FROM SENSOR 91
$VBIAS_{IN}$ BIAS VOLTAGE OF OUTPUT SIGNAL LINE FROM SENSOR
$VBIAS_{AMP}$ BIAS VOLTAGE OF NON-INVERTING INPUT TERMINAL OF OPERATIONAL AMPLIFIER OPAMP1
VOUT OUTPUT OF INTEGRATION CIRCUIT 410
VOUT_DRS OUTPUT OF ANALOG FRONT END 400, 500
$DCAL_{BIAS}$ OUTPUT OF FEEDBACK LOOP OF GM-CALIBRATION BLOCK 530
$DIN_{BIAS}$ INPUT SIGNAL TO DA CONVERSION CIRCUIT 440 (DAC)
$V_{PDL}$, $V_{PDH}$ BIAS VOLTAGE
VPD CATHODE VOLTAGE OF PHOTODIODE PD

The invention claimed is:

1. An analog front end that reads from a sensor an output signal which is either a current output signal or a charge output signal outputted to an output signal line, comprising:
   a transimpedance amplifier that converts the output signal into a voltage signal; and
   a variable bias voltage generation circuit, wherein
   the sensor is a light receiving pixel that includes a photodiode and a transistor having a gate terminal connected to the photodiode and a source terminal or an emitter terminal connected to the output signal line,
   the output signal changes depending on a bias voltage of the output signal line, and
   the variable bias voltage generation circuit corrects characteristics of the sensor by adjusting the bias voltage of the output signal line.

2. The analog front end according to claim 1, further comprising
   a current source, wherein
   the output signal line is connected to the current source during a reset period of the sensor, or immediately after the reset period ends, and
   at a time of the connection, the adjustment of the bias voltage is performed such that a current flowing through the output signal line has a predetermined value.

3. The analog front end according to claim 2, further comprising
   a current integration circuit for detecting a current flowing through the output signal line.

4. The analog front end according to claim 1, wherein the variable bias voltage generation circuit includes a digital to analog conversion circuit that generates a voltage signal.

5. The analog front end according to claim 1, wherein the sensor further includes a switch for resetting the photodiode.

6. An analog front end that reads from a sensor an output signal which is either a current output signal or a charge output signal, comprising:
   a transimpedance amplifier that converts the output signal into a voltage signal;
   a variable bias voltage generation circuit; and
   a current source, wherein
   the output signal changes depending on a bias voltage of an output signal line from the sensor,
   the variable bias voltage generation circuit corrects characteristics of the sensor by adjusting the bias voltage of the output signal line,
   the output signal line is connected to the current source during a reset period of the sensor, or immediately after the reset period ends, and
   at a time of the connection, the adjustment of the bias voltage is performed such that a current flowing through the output signal line has a predetermined value.

7. The analog front end according to claim 6, further comprising
   a current integration circuit for detecting a current flowing through the output signal line.

8. The analog front end according to claim 6, wherein the variable bias voltage generation circuit includes a digital to analog conversion circuit that generates a voltage signal.

* * * * *